United States Patent
Reusche et al.

(10) Patent No.: US 6,895,895 B2
(45) Date of Patent: May 24, 2005

(54) BIRD BATH MOUNTING ASSEMBLY

(75) Inventors: Thomas K. Reusche, Elburn, IL (US); Donald B. Owen, Batavia, IL (US); Joe Blahnik, St. Charles, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 10/441,489

(22) Filed: May 20, 2003

(65) Prior Publication Data

US 2004/0149230 A1 Aug. 5, 2004

Related U.S. Application Data

(60) Provisional application No. 60/445,018, filed on Feb. 4, 2003.

(51) Int. Cl.[7] .......................... A01K 29/00; A01K 45/00
(52) U.S. Cl. ...................................... 119/69.5; 119/61.4
(58) Field of Search .......................... 119/61, 69.5, 72, 119/61.4, 61.52, 61.57; 239/28; 248/219.2, 291.1, 311.2

(56) References Cited

U.S. PATENT DOCUMENTS

| | | | | |
|---|---|---|---|---|
| 556,900 A | * | 3/1896 | Richmond | 119/61.4 |
| 1,063,661 A | * | 6/1913 | Critz, Jr. | 119/61.4 |
| 1,531,617 A | * | 3/1925 | Jahde | 119/61.4 |
| 1,881,065 A | * | 10/1932 | Shirley | 119/61 |
| 2,574,174 A | * | 11/1951 | Dyrdahl | 119/61.4 |
| 3,995,591 A | * | 12/1976 | Garwood | 119/69.5 |
| 4,640,226 A | * | 2/1987 | Liff | 119/69.5 |
| 5,005,524 A | * | 4/1991 | Berry | 119/51.11 |
| 5,117,779 A | * | 6/1992 | Karow | 119/69.5 |
| 5,299,769 A | | 4/1994 | Reusche et al. | 248/219.2 |
| 5,353,741 A | | 10/1994 | Gryzlak | 119/69.5 |
| 5,853,158 A | * | 12/1998 | Riggle | 248/311.2 |
| 6,484,666 B1 | | 11/2002 | Reusche | 119/69.5 |

* cited by examiner

Primary Examiner—Robert P. Swiatek
(74) Attorney, Agent, or Firm—McAndrews, Held & Malloy (57) ABSTRACT

A bird bath including a basin configured to receive and retain water, and a mounting a mounting assembly configured to securably mount the bird bath to a structure. The mounting assembly supports the basin and includes a mounting bracket configured to mount to the structure and a pivoting bracket pivotally secured to the mounting bracket. The basin is secured to the pivoting bracket, which is configured to pivot with respect to the mounting bracket so that the basin may move between a secured retracted position for receiving and retaining water within the basin and a fully extended position for emptying contents of the basin.

21 Claims, 9 Drawing Sheets

BIRD BATH MOUNTING ASSEMBLY

RELATED APPLICATIONS

This application relates to and claims priority benefits from U.S. Provisional Patent Application No. 60/445,018 entitled "Bird Bath Mounting Assembly," filed Feb. 4, 2003, which is incorporated by reference herein in its entirety.

BACKGROUND OF THE INVENTION

The present invention generally relates to a bird bath, and more specifically to a bird bath having a mounting assembly that provides an easier way of cleaning and emptying a basin of the bird bath.

A local bird population will remain faithful to a particular area if a ready source of water and food is available. Consequently, bird baths are popular for attracting birds to residential homes, for example, and they may promote an interest in, and the well-being of, birds. An exemplary bird bath is described in U.S. Pat. No. 6,484,666, issued Nov. 26, 2002 to Thomas K Reusche, and assigned to Allied Precision Industries, Inc., which is hereby incorporated by reference in its entirety.

Typically, the water retained within a particular bird bath is emptied periodically. That is, new, fresh water replaces the dirty, stale, stagnant, bacteria-ridden (and possibly insect and/or larval ridden) water left behind from the frequent presence of various birds. In order to empty the water from a basin of a bird bath, the entire bird bath typically must be tilted over or otherwise manipulated. Some bird baths include a basin that may be removed from a base. In this case, the basin must be removed and manually manipulated by an individual in order to empty the contents of the basin.

Typically, manually manipulating a bird bath or a basin of a bird bath is awkward. Many bird baths and basins are bulky and heavy. Additionally, when a basin is filled with water, the sheer weight of the bird bath may be too heavy for some individuals to safely manipulate the basin.

Thus, a need exists for a bird bath having a basin that may be easily and efficiently emptied.

BRIEF SUMMARY OF THE INVENTION

Certain embodiments of the present invention provide a bird bath comprising a basin configured to receive and retain water, and a mounting assembly configured to securably mount the bird bath to a structure, such as a deck rail, column, stump or pedestal. The mounting assembly securably supports the basin. The mounting assembly includes a mounting bracket configured to mount to the structure and a pivoting bracket pivotally secured to the mounting bracket. The basin is secured to the pivoting bracket and the pivoting bracket is configured to pivot with respect to the mounting bracket so that the basin may move between a secured retracted position for receiving and retaining water within the basin and a fully extended position for emptying contents of the basin.

The pivoting bracket may include a tab and the mounting bracket may include a slot and a lip. In this case, the pivoting bracket connects to the mounting bracket by way of the tab being inserted into the slot. The pivoting bracket may pivot with respect to the mounting bracket through the tab pivoting about the lip. The pivoting bracket includes an angled tab extending outwardly therefrom. The angled tab allows a user to pivot the pivoting bracket with respect to the mounting bracket. The mounting bracket includes a locking hole formed therein and the pivoting bracket includes a ramped latch member. The ramped latch member is latchably secured within the locking hole in the secured retracted position.

The mounting assembly also includes fasteners and a protection plate configured to slide relative to the mounting bracket. The fasteners engage the protection plate in order to compressively sandwich the structure between the mounting plate and an interior surface of the mounting bracket.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 1:
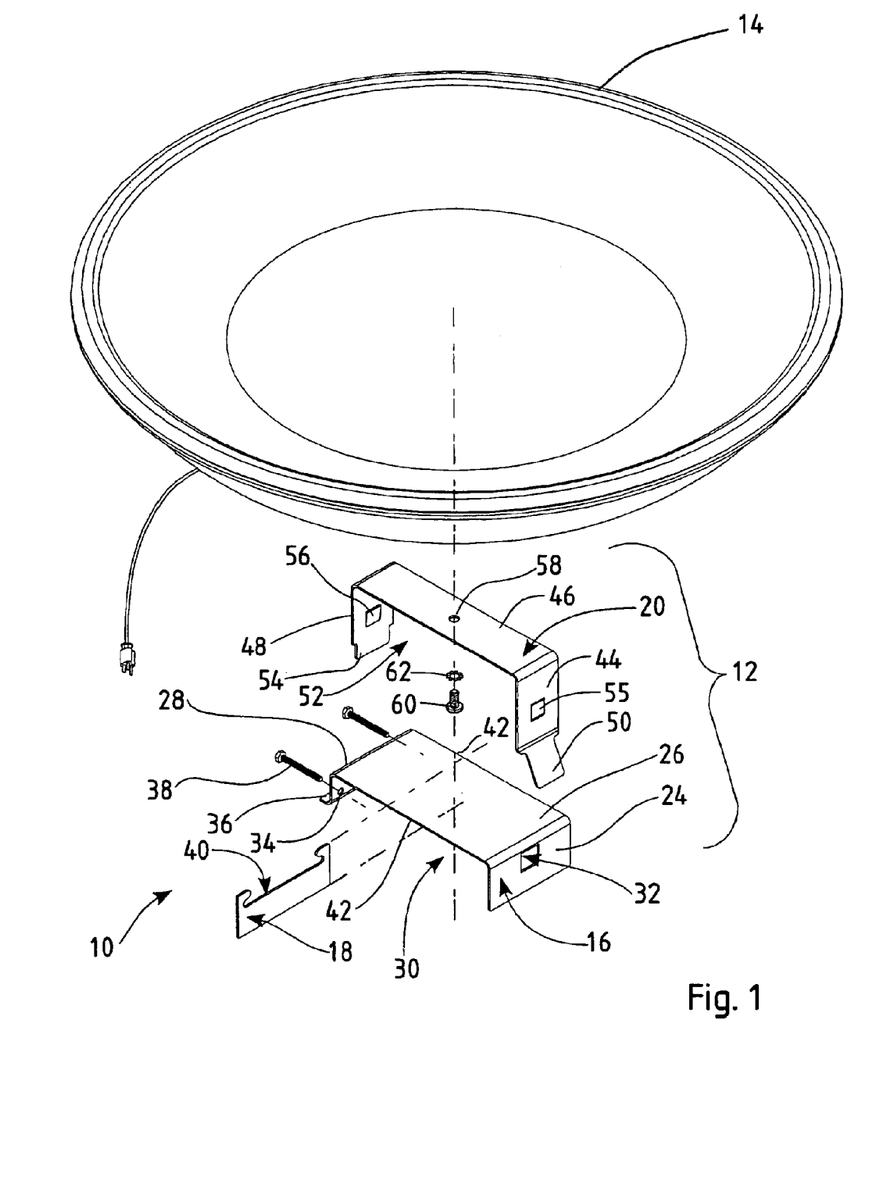
FIG. 1 illustrates an isometric exploded view of a bird bath according to an embodiment of the present invention.

FIG. 1 illustrates an isometric exploded view of a bird bath 10 according to an embodiment of the present invention. The bird bath 10 includes a mounting assembly 12 that supports a basin 14. The mounting assembly 12 includes a mounting bracket 16, a deck protection plate 18 and a pivoting bracket 20. The basin 14 is configured to receive and retain water. The basin 14 may include a heating element (not shown) that may be electrically connected to a power cord 22. Alternatively, the basin 14 may be unheated, in which case the basin 14 does not include a heating element or a power cord 22.

The mounting bracket 16 may be secured to a deck rail, a pedestal, a column, or any other structure that may support a basin of a bird bath. The mounting bracket 16 includes a leg 24 formed integrally with a top plate 26, which is in turn formed integrally with a leg 28. The planes of the legs 24 and 28 are parallel with one another. The plane of the top plate 26 is perpendicular to the planes of the legs 24 and 28. A deck reception channel 30 is formed between the leg 24 and 28 and the underside of the top plate 28. The leg 24 includes a locking hole 32 formed proximate the top plate 28. Further, the leg 28 includes fastener holes 34 formed therethrough, proximate a lip 36 that extends outwardly from the leg 28. The plane of the lip 36 may be parallel with the plane of the top plate 26. The fastener holes 34 may be threaded and are configured to allow screws 38 to pass therethrough.

The deck protection plate 18 includes a slotted area 40 that is configured to receive and retain lateral edges 42 of the top plate 26. The deck protection plate 18 may slide over the lateral edges 42 through the slotted area 40.

The pivoting bracket 20 includes a first upright member 44 formed integrally with a horizontal member 46, which is in turn formed integrally with a second upright member 48. An angled tab 50, which is formed integrally with the first upright member 44, extends outwardly from a lower portion of the first upright member 44. The angled tab 50 is angled outwardly from an interior mounting bracket reception area 52. A tab 54 extends downwardly from the second upright member 48 and is at least substantially coplanar with the second upright member 48. Both the first and second upright members 44 and 48 include respective ramped latch members 55 and 56 formed on interior surfaces of the first and second upright members 44. That is, the ramped latch members 55 and 56 extend inwardly toward the interior mounting bracket reception area 52.

A fastener hole 58 is formed through the center of the horizontal member 46. The basin 14 is secured to the pivoting bracket 20 by way of a screw 60. The screw 60 threads through a locking washer 62 and the fastener hole 58 and engages a corresponding receptacle (not shown) formed within a bottom surface of the basin 14 in order to secure the pivoting bracket 20 to the underside of the basin 14.

Figure 2:
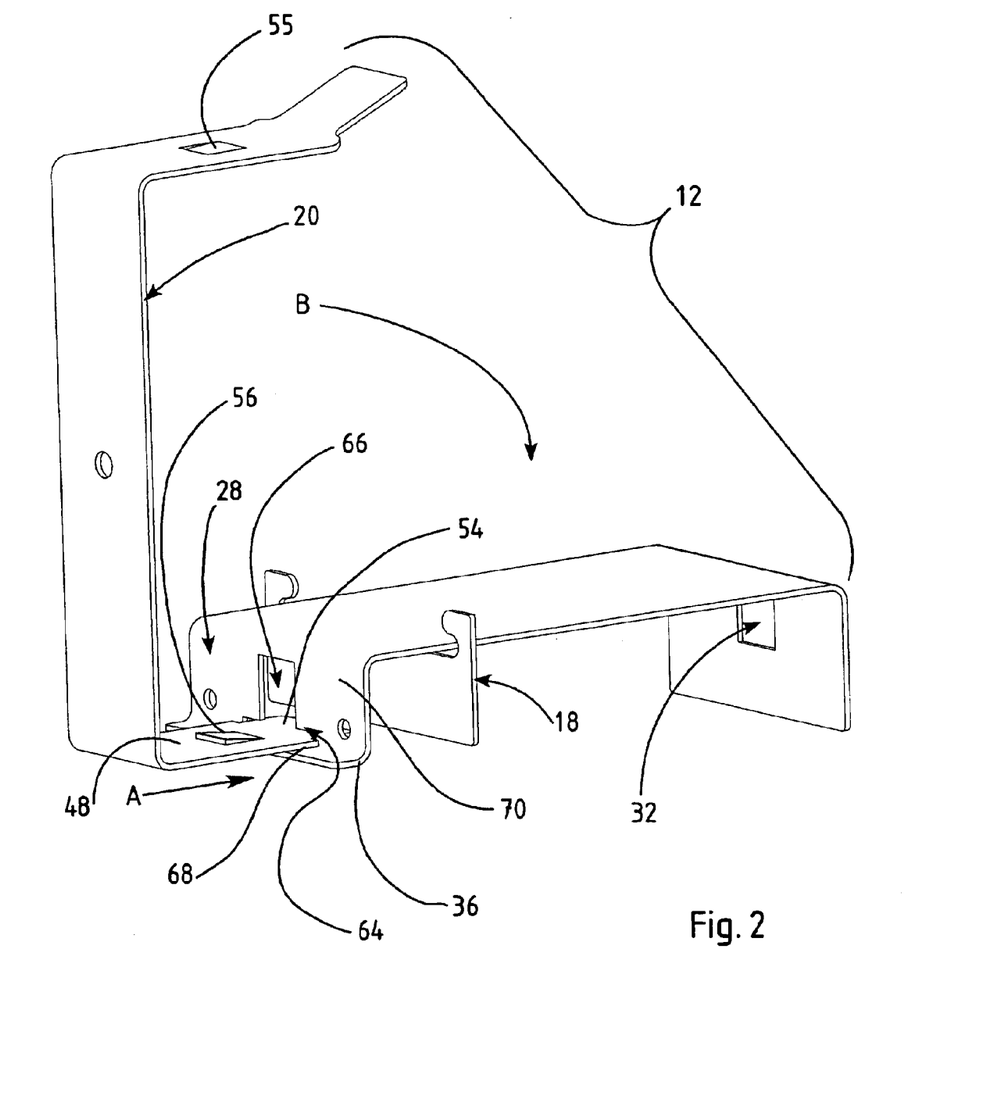
FIG. 2 illustrates an isometric view of a mounting assembly according to an embodiment of the present invention.

FIG. 2 illustrates an isometric view of a mounting assembly 12 according to an embodiment of the present invention. The mounting bracket 16 includes a slot 64 formed above and proximate the lip 36 of the leg 28. The slot 64 is integrally formed with a latch reception cavity 66. In order to assemble the mounting assembly, the tab 54 of the second upright member 48 of the pivoting bracket 20 is inserted into the slot 64 until lower edges 68 of the second upright member 48 abut an outer surface 70 of the leg 28. As shown in FIG. 2, the pivoting bracket 20 is in a fully pivoted, or extended position. Once the pivoting bracket 20 is joined with the mounting bracket 16 as discussed above, the pivoting bracket 20 may pivot downwardly in the direction of line B. The pivoting bracket 20 pivots with respect to the mounting bracket 16 by way of the second upright member 48 pivoting on the lip 36. The second upright member 48 remains joined to the mounting bracket 16 by way of the tab 54 being pivotally attached through the slot 64.

Alternatively, a hinge or swivel integrally joining the mounting bracket 16 to the pivoting bracket 20 may be used to allow the pivoting bracket 20 to pivot with respect to the mounting bracket 16. Also, alternatively, the mounting bracket 16 and the pivoting bracket 20 may include fastener channels that are coaxially aligned when the mounting bracket 16 and the pivoting bracket 20 are joined. A pin may be inserted through the fastener channels to securably retain the mounting bracket 16 to the pivoting bracket 20, thereby allowing the pivoting bracket 20 to pivot with respect to the mounting bracket 16.

Figure 3:
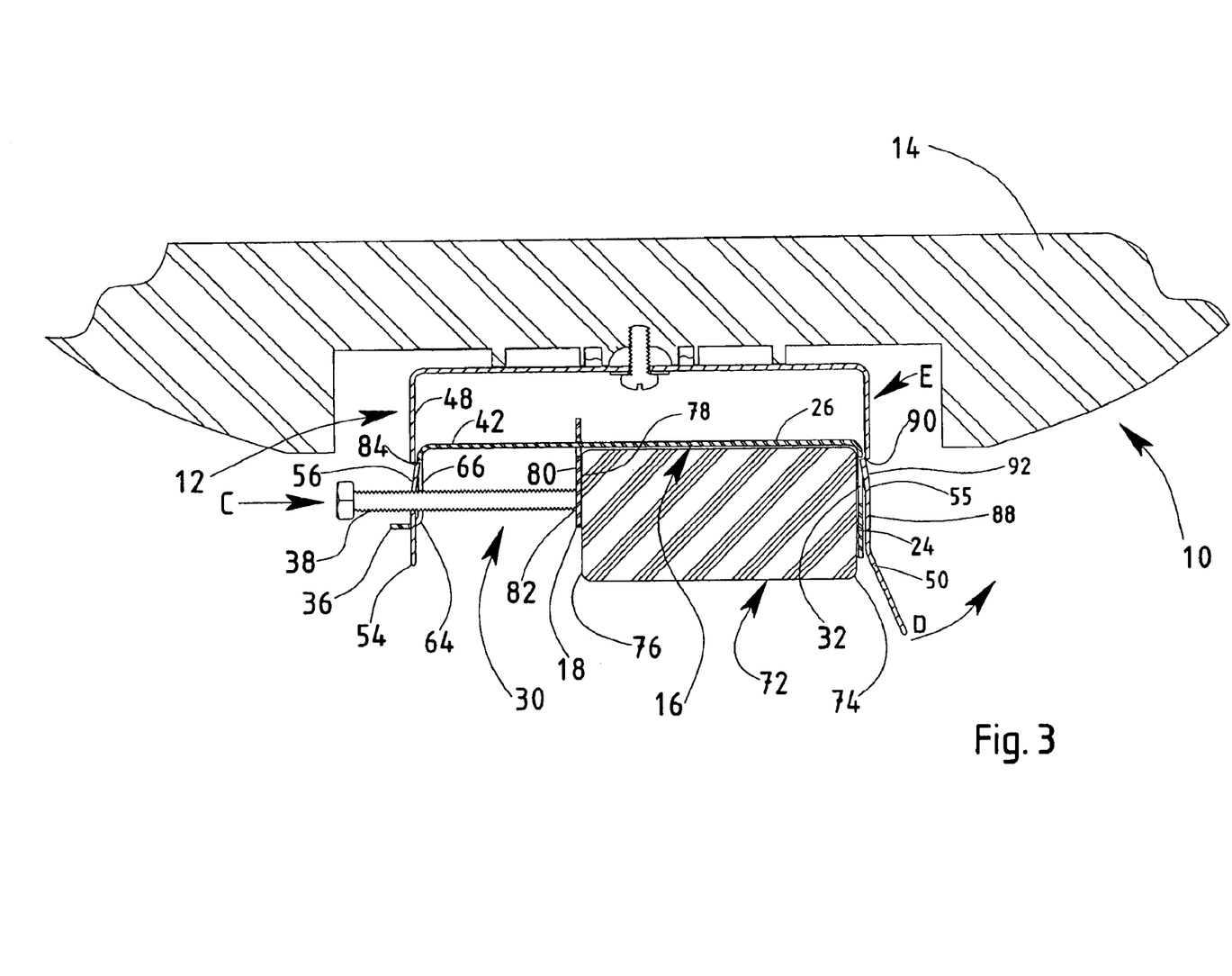
FIG. 3 illustrates a transverse cross sectional view of a bird bath according to an embodiment of the present invention.

FIG. 3 illustrates a transverse cross sectional view of the bird bath 10 of FIG. 1. The mounting assembly 12 is secured to a deck rail 72 through the mounting bracket 16 and the deck protection plate 18. The deck rail 72 is positioned within the deck reception channel 30 such that a first side 74 of the deck rail 72 abuts an interior wall of the leg 24. A second side 76 of the deck rail 72 abuts an interior surface 78 of the deck protection plate 18. The exterior surface 80 of the deck protection plate 18 abuts the distal ends 82 of the screws 38. As the screws 38 are engaged into the deck protection plate 18 (that is, tightened) thereby causing the deck protection plate 18 to slide over the lateral edges 42 of the top plate 26 in the direction of line C, the deck protection plate 18 exerts a corresponding force into the deck rail 72, thereby compressively sandwiching the deck rail 72 between the interior surface 78 of the deck protection plate 18 and the interior surface of the leg 24. Thus, the mounting bracket 16 is secured to the deck rail 72. Optionally, the deck protection plate 18 is not used, and the screws 38, or other such fasteners, are engaged directly into the deck rail 72. Alternatively, the mounting bracket 16 may be secured to the deck rail, pedestal, column, or other such structure through nails, other fasteners, glue or the like. Also, alternatively, the mounting bracket 16 may be integrally formed with a structure, such as a pedestal or column.

As shown in FIG. 3, the bird bath 10 is in a retracted state such that water may be retained within the basin 14. In the retracted state, the tab 54 of the second upright member 48 of the pivoting bracket 20 is positioned through the slot 64 of the mounting bracket 16 such that the plane of the tab 54 is substantially perpendicular to the plane of the lip 36. Further, the ramped latch member 56 of the second upright member 48 is positioned within the latch reception cavity 66 such that an upper edge 84 of the ramped latch member 56 abuts an upper edge 86 that partially defines the latch reception cavity 66. Similarly, the latch member 55 of the first upright member 44 of the pivoting bracket 20 is received and retained within the locking hole 32 of the leg 24.

As the bird bath 10 is pivoted into a retracted position in the direction of line B shown in FIG. 2, a ramped surface 88 of the ramped latch member 55 slides over an upper edge 90 that partially defines the locking hole 32 until an edge 92 of the ramped latch member 55 engages or catches the upper edge 90. Once the edge 92 engages the upper edge 90, the pivoting bracket 20 is locked or otherwise secured to the mounting bracket 16.

In order to disengage the ramped latch member 55 from the locking hole 32, the angled tab 50 is pulled, or otherwise urged, in the direction of line D. As the angled tab 50 is urged in the direction of line D, the edge 92 of the ramped latch member 55 moves slightly in the direction of line E, thereby freeing itself from the upper edge 90 that partially defines the locking hole 32. As the angled tab 50 is further urged in the direction of line D, the ramped latch member 55 disconnects from the locking hole 32. Alternatively, the ramped latch members 55 may be formed on the mounting bracket 16, while the locking hole 32 and the latch reception cavity 66 may be formed through portions of the pivoting bracket 20.

Figure 4:
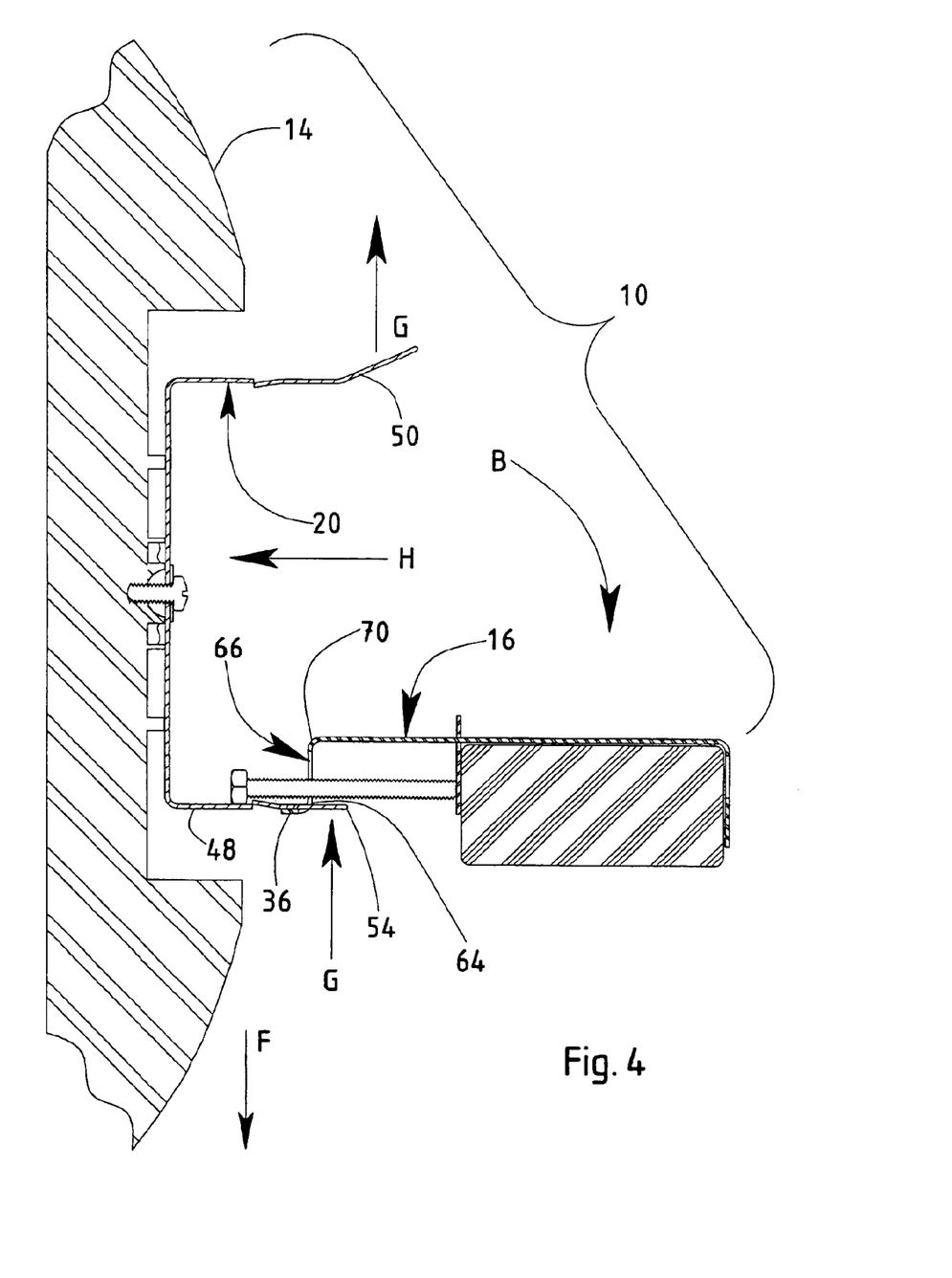
FIG. 4 illustrates a transverse cross sectional view of a bird bath in a fully extended position according to an embodiment of the present invention.

FIG. 4 illustrates a transverse cross sectional view of the bird bath 10 in a fully extended, or tipped, position according to an embodiment of the present invention. In the fully extended position, water may be completely emptied from the basin 14. The force of the weight of the basin 14 in the direction of line F, and/or a force exerted on the angled tab 50 in the direction of line G, causes the tab 54 of the second upright member 48 of the pivoting bracket 20 to exert an equal, but opposite, force into upper edges that partially define the slot 64 in the direction of line G (consequently, the upper edges exert a force into the tab 54 in the direction of line F). That is, the tab 54 is forced into lower edges of the outer surface 70 of the leg 28 of the mounting bracket 16, thereby halting further motion of the pivoting bracket 20 and the basin in the direction of line F. At the same time, a portion of the second upright member 48 exerts a force in the direction of line F into the lip 36 (with the lip exerting an equal, but opposite, force in the direction of line G into the upright member 48). Thus, the basin 14 is held in a static position due to the various forces exerted within the bird bath 10. The various forces exerted in the directions of lines F and G cancel one another and the basin 14 is held in the fully extended position, as shown in FIG. 4.

Thus, the basin 14 may be emptied without the pivoting bracket 20 detaching from the mounting bracket 16. The pivoting bracket 20 may be detached from the mounting bracket 16 by moving the basin 14 in the direction of line B so that the tab 54 is not urged upward into lower edges of the outer surface 70. Then, the basin 14 and the attached pivoting bracket 20 are slid away from the mounting bracket 16 in the direction of line H, thereby allowing the tab 54 to slide accordingly through the slot 64.

Figure 5:
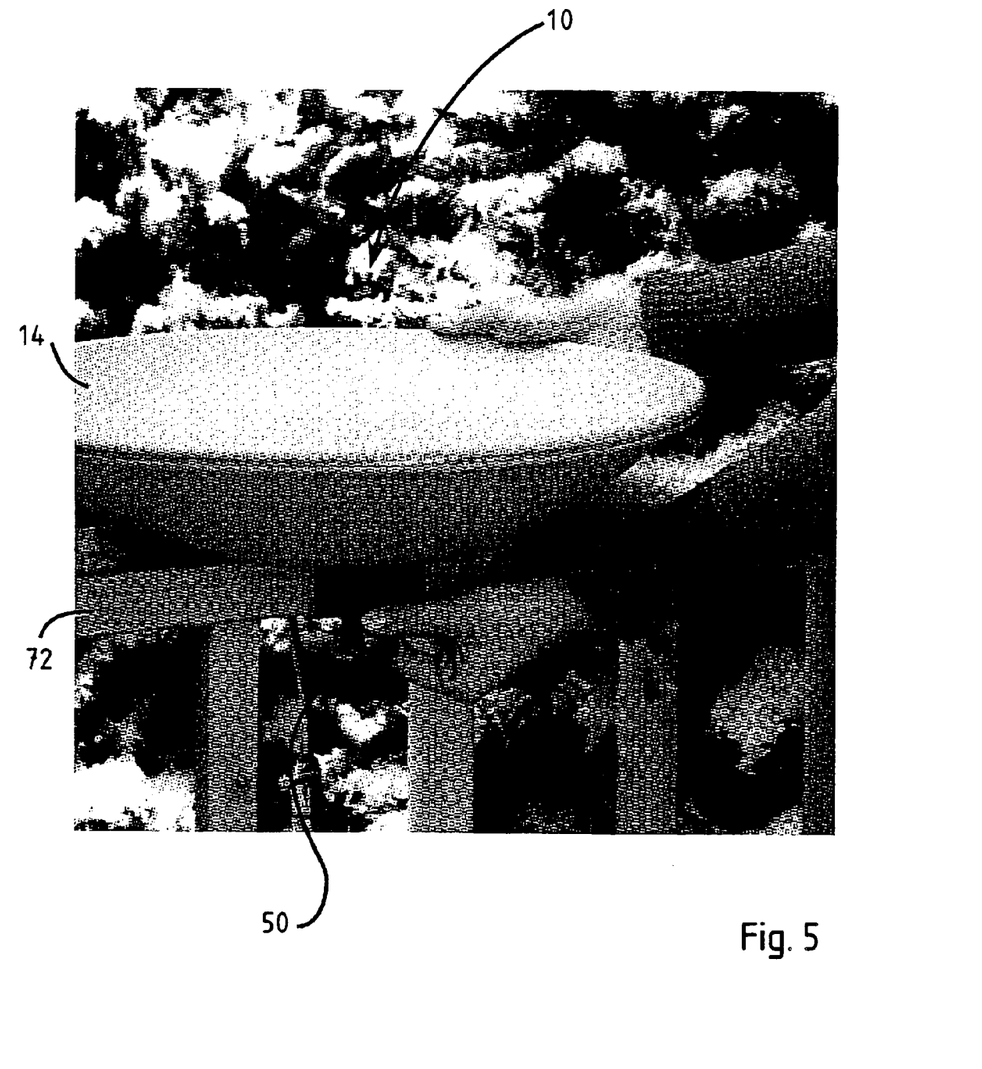
FIG. 5 illustrates a bird bath in an initial position according to an embodiment of the present invention.

FIG. 5 illustrates a bird bath 10 in an initial position according to an embodiment of the present invention. As shown in FIG. 5, an individual is pulling on the angled tab 50 in order to begin to empty the contents of the basin 14.

Figure 6:
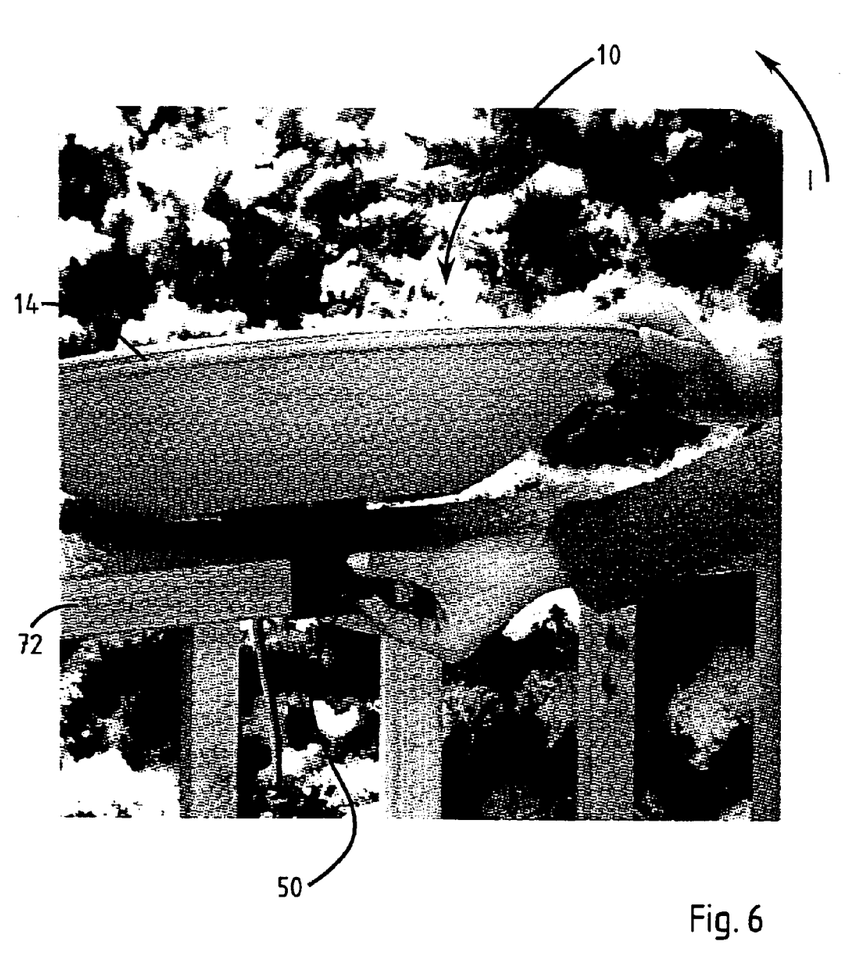
FIG. 6 illustrates a bird bath in a progressed emptying position according to an embodiment of the present invention.

FIG. 6 illustrates a bird bath 10 in a progressed emptying position according to an embodiment of the present invention. As shown in FIG. 6, the user moves the basin 14 in the direction of line I by way of the angled tab 50 and/or pushing on the underside of the basin 14.

Figure 7:
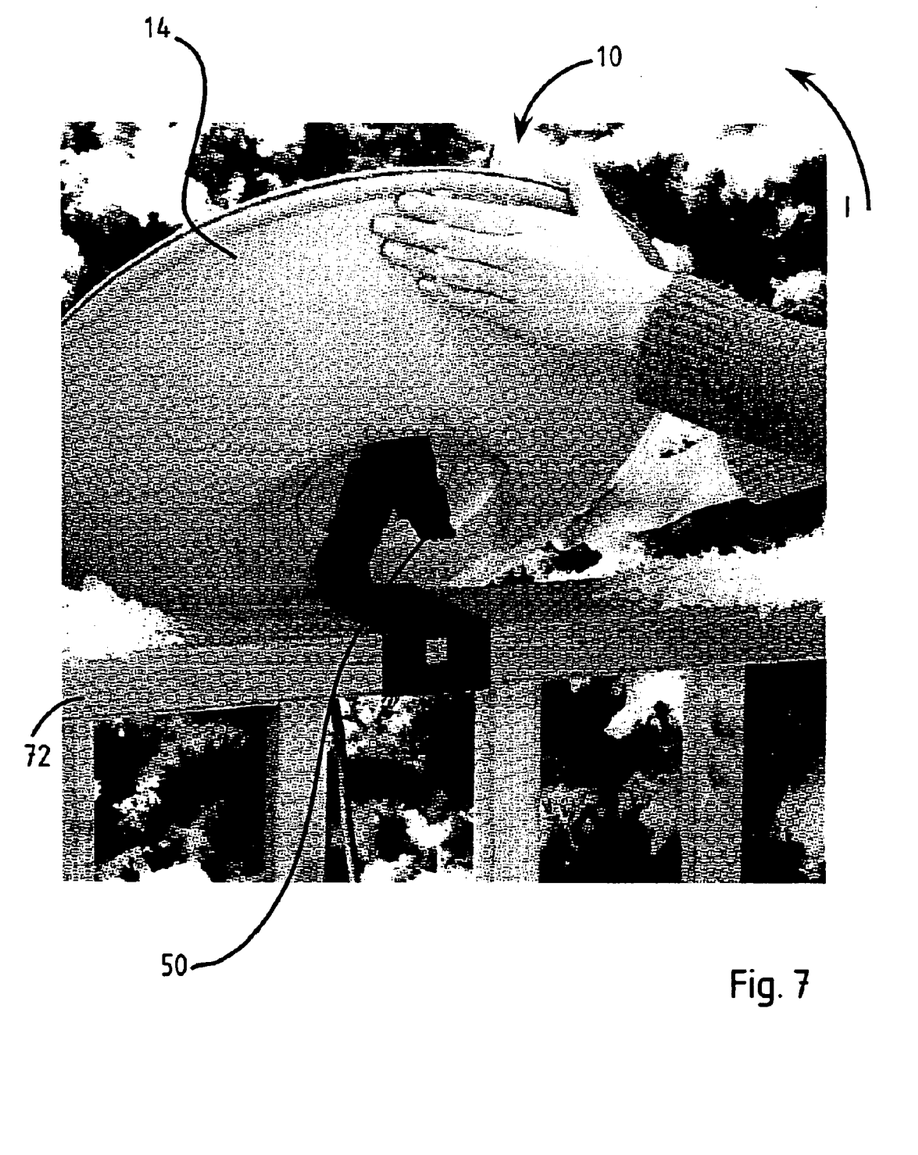
FIG. 7 illustrates a bird bath in an advanced emptying position according to an embodiment of the present invention.

FIG. 7 illustrates a bird bath 10 in an advanced emptying position according to an embodiment of the present invention. As shown in FIG. 7, the user continues to move the basin 14 in the direction of line I. The user may move the basin 14 by way of the angled tab 50, or by urging the basin 14 in the direction of line I by pushing the underside of the basin 14, as shown.

Figure 8:
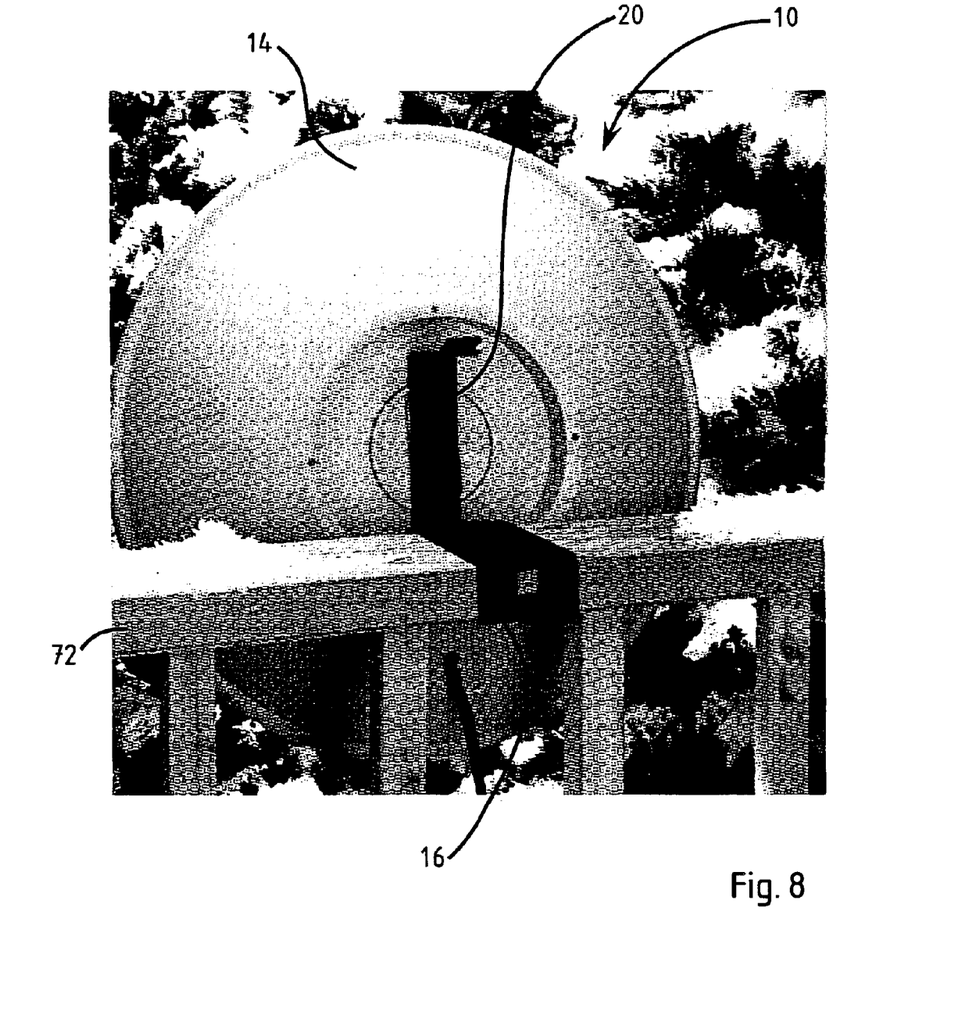
FIG. 8 illustrates a bird bath in a fully-extended, tipped position according to an embodiment of the present invention.

FIG. 8 illustrates a bird bath 10 in a fully-extended, tipped position according to an embodiment of the present invention. In the fully extended position, the pivoting bracket 20 remains joined with the mounting bracket 16 as discussed above with respect to FIG. 4. In the fully extended position, the contents of the basin 14 are completely emptied.

Figure 9:
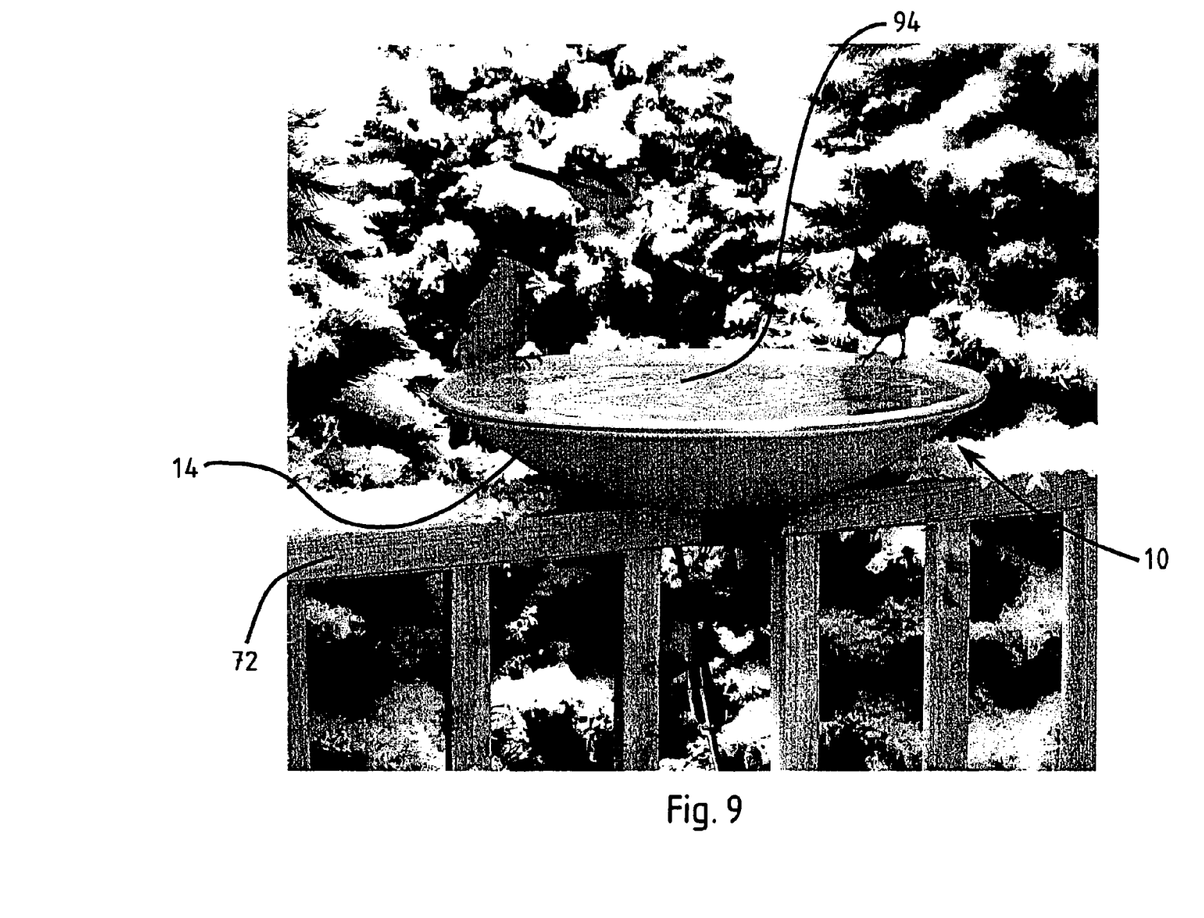
FIG. 9 illustrates a bird bath in a bird bathing state according to an embodiment of the present invention.

FIG. 9 illustrates a bird bath 10 in a bird bathing state according to an embodiment of the present invention. As shown in FIG. 9, the basin 14 retains water 94 and birds may bathe in the basin 14.

Thus, embodiments of the present invention provide a bird bath having a basin that may be easily and efficiently emptied.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A bird bath comprising:
   a basin configured to receive and retain water at all levels up to said brim for bird bathing; and
   a mounting assembly configured to securably mount said bird bath to a structure, said mounting assembly supporting said basin, said mounting assembly comprising a mounting bracket configured to mount to said structure and a pivoting bracket pivotally secured to said mounting bracket, said pivoting bracket including an angle tab extending outwardly therefrom, said angled tab allowing a user to pivot said pivoting bracket with respect to said mounting bracket, said basin being secured to said pivoting bracket, said pivoting bracket configured to pivot with respect to said mounting bracket so that said basin may move between a secured retracted position for receiving and retaining water within said basin and a fully extended position for emptying contents of said basin.

2. The bird bath of claim 1, wherein said pivoting bracket includes a tab and said mounting bracket includes a slot and a lip wherein said pivoting bracket connects to said mounting bracket through said tab being inserted into said slot, said pivoting bracket pivoting with respect to said mounting bracket through said tab pivoting about said lip.

3. The bird bath of claim 1, wherein said mounting bracket includes a locking hole formed therein, said pivoting bracket includes a ramped latch member, and wherein said ramped latch member is latchably secured within said locking hole when said basin is in said secured retracted position.

4. The bird bath of claim 1, wherein said mounting assembly includes fasteners and a protection plate configured to slide relative to said mounting bracket, said fasteners engaging said protection plate in order to compressively sandwich said structure between said protection plate and an interior surface of said mounting bracket.

5. The bird bath of claim 1, wherein said basin includes a heating element.

6. The bird bath of claim 1, wherein said structure is a deck rail.

7. The bird bath of claim 1, wherein said structure is one of a deck rail, a pedestal and a column.

8. A mounting assembly for a bird bath having a basin having a brim, wherein the basin is configured to be filled at levels up to the brim and to allow birds to bathe therein, said mounting assembly comprising:
   a mounting bracket configured to mount to a deck rail and a pivoting bracket pivotally secured to said mounting bracket, said pivoting bracket including an angled tab extending outwardly therefrom, said angled tab allowing a user to pivot said pivoting bracket with respect to said mounting bracket, said pivoting bracket being configured to support a basin of a bird bath, said pivoting bracket configured to pivot with respect to said mounting bracket so that said pivoting bracket moves between a secured, retracted position and a fully extended position.

9. The mounting assembly of claim 8, wherein said pivoting bracket includes a tab and said mounting bracket includes a slot and a lip wherein said pivoting bracket connects to said mounting bracket through said tab being inserted into said slot, said pivoting bracket pivoting with respect to said mounting bracket through said tab pivoting about said lip.

10. The mounting assembly of claim 8, wherein said mounting bracket includes a locking hole formed therein, said pivoting bracket includes a ramped latch member, and wherein said ramped latch member is latchably secured within said locking hole when said pivoting bracket is in said secured, retracted position.

11. The mounting assembly of claim 8, further comprising fasteners and a protection plate configured to slide relative to said mounting bracket, said fasteners engaging said protection plate in order to compressively sandwich said deck rail between said protection plate and an interior surface of said mounting bracket.

12. A bird bath comprising:
   a basin having a brim, said basin being configured to receive and retain water at all levels up to said brim for bird bathing;
   a mounting assembly configured to securably mount said bird bath to a structure, said mounting assembly secured to said basin, and said mounting assembly comprising a pivoting member that allows said basin to be pivoted while said mounting assembly is connected to said structure, wherein said structure remains in a fixed orientation while said basin is pivoted; and
   an angled member extending outwardly from said pivoting member, said angled member allowing a user to pivot said pivoting member with respect to said structure.

13. The bird bath of claim 12, wherein said mounting assembly further comprises a mounting bracket configured to mount to said structure and a pivoting bracket pivotally secured to said mounting bracket, said basin being secured to said pivoting bracket, said pivoting bracket configured to pivot with respect to said mounting bracket through said pivoting member so that said basin may move between a secured retracted position for receiving and retaining water within said basin and a fully extended position for emptying contents of said basin.

14. The bird bath of claim 13, wherein said mounting bracket includes a locking hole formed therein, said pivoting bracket includes a ramped latch member, and wherein said ramped latch member is latchably secured within said locking hole in said secured retracted position.

15. The bird bath of claim 13, wherein said mounting assembly includes fasteners and a protection plate configured to slide relative to said mounting bracket, said fasteners engaging said protection plate in order to compressively sandwich said structure between said protection plate and an interior surface of said mounting bracket.

16. The bird bath of claim 12, wherein said basin includes a heating element.

17. The bird bath of claim 12, wherein said structure is a deck rail.

18. The bird bath of claim 12, wherein said structure is one of a deck rail, a pedestal and a column.

19. A bird bath comprising:
   a basin having a brim, said basin being configured to received and retain water all levels up to said brim for bird bathing; and
   a mounting assembly configured to securably mount said bird bath to a structure, said mounting assembly supporting said basin, said mounting assembly comprising a mounting bracket configured to mount to said structure and a pivoting bracket pivotally secured to said mounting bracket; said pivoting bracket including a tab and said mounting bracket including a slot and lip wherein said pivoting bracket connects to said mounting bracket through said tab being inserted into said slot, said basin being secured to said pivoting bracket, said pivoting bracket configured to pivot with respect to said mounting bracket when said tab pivots about said lip so that said basin may move between a secured retracted position for receiving and retaining water within said basin and a fully extended position for emptying contents of said basin.

20. A bird bath comprising:
   a basin having a brim, said basin being configured to receive and retain water at all levels up to said brim for bird bathing; and
   a mounting assembly configured to securably mount said bird bath to a structure, said mounting assembly supporting said basin, said mounting assembly comprising a mounting bracket configured to mount to said structure and a pivoting bracket pivotally secured to said mounting bracket, said basin being secured to said pivoting bracket, said pivoting bracket configured to pivot with respect to said mounting bracket so that said basin may move between a secured retracted position for receiving and retaining water within said basin and a fully extended position for emptying contents of said basin,
   said mounting bracket including a locking hole formed therein, said pivoting bracket including a ramped latch member, wherein said ramped latch member is latchably secured within said locking hole when said basin is in said secured retracted position.

21. A bird comprising:
   a basin having a brim, said basin being configured to receive and retain water at all levels up to said brim for bird bathing; and
   a mounting assembly configured to securably mount said bird bath to a structure, said mounting assembly supporting said basin, said mounting assembly comprising:
      a mounting bracket configured to mount to said structure and a pivoting bracket pivotally secured to said mounting bracket, said basin being secured to said pivoting bracket, said pivoting bracket configured to pivot with respect to said mounting bracket so that said basin may move between a secured retracted position for receiving and retaining water within said basin and a fully extended position for emptying contents of said basin; and
   fasteners and a protection plate configured to slide relative to said mounting bracket, said fasteners engaging said protection plate in order to compressively sandwich said structured between said protection plate and an interior surface of said mounting bracket.

* * * * *